US012763938B2

(12) United States Patent
Zhou et al.

(10) Patent No.: US 12,763,938 B2
(45) Date of Patent: Oct. 13, 2026

(54) QUANTUM KEY-BASED BLOCKCHAIN NETWORK AND DATA SECURE TRANSMISSION METHOD

(71) Applicant: JINAN INSTITUTE OF QUANTUM TECHNOLOGY, Jinan (CN)

(72) Inventors: Fei Zhou, Jinan (CN); Jie Gao, Jinan (CN)

(73) Assignee: JINAN INSTITUTE OF QUANTUM TECHNOLOGY, Jinan (CN)

( * ) Notice: Subject to any disclaimer, the term of this patent is extended or adjusted under 35 U.S.C. 154(b) by 0 days.

(21) Appl. No.: 18/705,556

(22) PCT Filed: May 25, 2022

(86) PCT No.: PCT/CN2022/095088

§ 371 (c)(1),
(2) Date: Apr. 28, 2024

(87) PCT Pub. No.: WO2023/082600

PCT Pub. Date: May 19, 2023

(65) Prior Publication Data

US 2024/0430080 A1 Dec. 26, 2024

(30) Foreign Application Priority Data

Nov. 10, 2021 (CN) ........................ 202111323379.6

(51) Int. Cl.
*H04L 9/08* (2006.01)
*H04L 9/32* (2006.01)

(52) U.S. Cl.
CPC .......... *H04L 9/0855* (2013.01); *H04L 9/3242* (2013.01)

(58) Field of Classification Search
CPC ....... H04L 9/0855; H04L 9/3242; H04L 9/08; H04L 9/0852; H04L 9/3239; H04L 9/50;
(Continued)

(56) References Cited

U.S. PATENT DOCUMENTS 6,304,658 B1 * 10/2001 Kocher .................. G06F 7/723 380/28
8,483,394 B2 * 7/2013 Nordholt .............. H04L 63/062 380/278

(Continued)

FOREIGN PATENT DOCUMENTS

CN 103490891 A 1/2014
CN 105827397 A 8/2016

(Continued)

OTHER PUBLICATIONS

Gerardo Iovane; "MuReQua Chain: Multiscale Relativistic Quantum Blockchain", Mar. 2021, IEEE Access, pp. 39827-39838. (Year: 2021).*

(Continued)

*Primary Examiner* — Rupal Dharia
(74) *Attorney, Agent, or Firm* — Kilpatrick Townsend & Stockton LLP

(57) ABSTRACT

A quantum-secured blockchain network and a method for secure data transmission across the quantum-secured blockchain network are provided. The quantum-secured blockchain network includes a blockchain subnet and a quantum key distribution subnet. The blockchain subnet includes multiple blockchain nodes. The quantum key distribution subnet includes multiple quantum key distribution nodes and is configured to distribute a shared quantum key between two of the quantum key distribution nodes. The quantum key distribution nodes are deployed in the respective blockchain nodes, for the blockchain nodes to acquire the shared quantum key from the quantum key distribution nodes. The blockchain nodes are configured to: encrypt data using the shared quantum key, for secure transmission of the data between the blockchain nodes. This is especially applicable to blockchain systems with high security requirements (Continued)

such as the blockchain government affairs system and the blockchain free trade system.

7 Claims, 3 Drawing Sheets

(58) Field of Classification Search
CPC ............ H04L 2209/56; H04L 63/0442; G06Q 20/3829
USPC ........................................................ 370/278
See application file for complete search history.

(56) References Cited

U.S. PATENT DOCUMENTS

| | | | | |
|---|---|---|---|---|
| 10,348,493 | B2 * | 7/2019 | Fu | H04L 45/00 |
| 10,708,046 | B1 * | 7/2020 | Ashrafi | H04L 9/0852 |
| 10,839,395 | B2 * | 11/2020 | Simons | H04L 9/3239 |
| 11,190,347 | B2 * | 11/2021 | Zhao | H04L 9/0852 |
| 11,477,015 | B1 * | 10/2022 | Smith | H04L 9/0852 |
| 11,728,980 | B2 * | 8/2023 | Vtyurina | G06F 21/72 713/155 |
| 11,888,978 | B1 * | 1/2024 | Wang | H04B 10/85 |
| 12,255,999 | B2 * | 3/2025 | Moore | H04L 9/3236 |
| 12,321,931 | B2 * | 6/2025 | Childe | G06Q 20/027 |
| 2005/0286723 | A1 * | 12/2005 | Vig | H04L 9/0855 380/278 |
| 2013/0227286 | A1 * | 8/2013 | Brisson | H04L 63/062 713/168 |
| 2014/0095623 | A1 | 4/2014 | Wiig et al. | |
| 2016/0248581 | A1 * | 8/2016 | Fu | H04L 9/0858 |
| 2017/0250796 | A1 | 8/2017 | Samid | |
| 2018/0046766 | A1 * | 2/2018 | Deonarine | G06F 21/6209 |
| 2019/0273617 | A1 * | 9/2019 | Maher | H04L 9/3242 |
| 2019/0319798 | A1 * | 10/2019 | Chalkias | H04L 9/3236 |
| 2020/0220732 | A1 * | 7/2020 | Shasha | G06Q 10/087 |
| 2020/0328886 | A1 * | 10/2020 | Newton | H04L 9/0819 |
| 2020/0344051 | A1 * | 10/2020 | Ashrafi | H04L 9/0852 |
| 2021/0044432 | A1 * | 2/2021 | Li | H04L 9/0852 |
| 2021/0089676 | A1 * | 3/2021 | Ford | H04L 9/0825 |
| 2021/0203502 | A1 * | 7/2021 | Cheung | H04L 9/50 |
| 2021/0281578 | A1 * | 9/2021 | Olson | H04L 63/20 |
| 2021/0306145 | A1 * | 9/2021 | Krauthamer | H04L 63/0428 |
| 2021/0364648 | A1 * | 11/2021 | Rakshit | G01S 19/258 |
| 2022/0094442 | A1 * | 3/2022 | Isaacson | G06N 10/00 |
| 2022/0103532 | A1 * | 3/2022 | Manevich | H04L 9/085 |
| 2022/0294616 | A1 * | 9/2022 | Parry | H04L 9/0855 |
| 2022/0393858 | A1 * | 12/2022 | Barger | H04L 9/50 |
| 2023/0020193 | A1 * | 1/2023 | Williams | H04L 9/0825 |
| 2023/0052049 | A1 * | 2/2023 | Barreto | G06F 9/45558 |
| 2023/0283384 | A1 * | 9/2023 | Ahn | H04L 9/08 398/43 |
| 2023/0360040 | A1 * | 11/2023 | Childe | G06Q 20/0655 |
| 2024/0078457 | A1 * | 3/2024 | Stockert | H04L 41/12 |

FOREIGN PATENT DOCUMENTS

| | | | | |
|---|---|---|---|---|
| CN | 108737114 A | | 11/2018 | |
| CN | 109104428 A | | 12/2018 | |
| CN | 110581763 A | | 12/2019 | |
| CN | 110690964 A | | 1/2020 | |
| CN | 110855438 A | | 2/2020 | |
| CN | 111106930 A | | 5/2020 | |
| CN | 111277404 A | | 6/2020 | |
| CN | 111555864 A | | 8/2020 | |
| CN | 111934784 A | | 11/2020 | |
| CN | 112073182 A | | 12/2020 | |
| CN | 113596135 A | | 11/2021 | |
| CN | 113765665 A | | 12/2021 | |
| KR | 101887964 B1 | | 8/2018 | |
| WO | 2021/090027 A1 | | 5/2021 | |
| WO | WO-2021148904 A1 | * | 7/2021 | H04L 9/08 |

OTHER PUBLICATIONS

Kiktenko et al.; “Quantum-secured blockchain”, May 2018, Quantum Science and Technology, pp. 1-8. (Year: 2018).*
Wang et al.; “A Practical Quantum Public-key Encryption Model”, 2017, IEEE, pp. 367-372. (Year: 2017).*
Gheorghiu et al.; “Quantum-Proofing the Blockchain”, 2017, Blockchain Research Institute, pp. 1-28. (Year: 2017).*
Tanwar et al.; “Machine Learning Adoption in Blockchain-Based Smart Applications: The Challenges, and a Way Forward”, Jan. 2, 2020., IEEE, Digital Object Identifier 10.1109/ACCESS.2019.2961372, pp. 474-488.pn. (Year: 2020).*
Torky et al.; “Proof of Space Transactions: A Novel Blockchain Protocol for Secure Authentication of Satellite Transactions”, Aug. 23, 2021, ResearchSquare, pp. 1-19. (Year: 2021).*
Bao et al.; “Blockchain-Based Secure Communication for Space Information Networks”, Aug. 2021, IEEE, pp. 50-57. (Year: 2020).*
Dong et al.; “Tree-topology-based quantum-key-relay strategy for secure multicast services”, May 2020, Journal of Optical Communications and Networking, vol. 12, No. 5, pp. 120-132. (Year: 2020).*
Clark et al.; “A Blockchain-based Reputation System for Small Satellite Relay Networks”, 2020, IEEE, pp. 1-8. (Year: 2020).*
Wang et al.; “Quantum Key Distribution for Security Guarantees Over Quantum-Repeater-Based QoS-Driven 3D Satellite Networks”, 2014, Communication and Information System Security Symposium, pp. 728-733. (Year: 2014).*
Cao et al.; “Hybrid Trusted/Untrusted Relay-Based Quantum Key Distribution Over Optical Backbone Networks”, Sep. 2021, IEEE Journal on Selected Areas in Communications, vol. 39, No. 9, pp. 2701-2718. (Year: 2021).*
Chen et al.; “An integrated space-to-ground quantum communication network over 4,600 kilometres”, Janury 2021, Nature, vol. 589, pp. 214-232. (Year: 2021).*
Qian et al.; “A Secure Communication Scheme for Power Grids Based on Multi-Resource Hybrid Quantum Key Distribution”, 2017, Elsevier, pp. 1-26. (Year: 2017).*
Safari et al.; “Relay-Assisted Free-Space Quantum-Key Distribution”, 2009, IEEE, pp. 112-117. (Year: 2017).*
Chen et al.; “An integrated space-to-ground quantum communication network over 4,600 kilometres”, Jan. 2021, Nature, vol. 589, pp. 214-232. (Year: 2021).*
Chen, Hui.; “Quantum Relay Blockchain and Its Applications in Key Service”, Jan. 2020, ACM, pp. 95-99. (Year: 2020).*
Sharma, Aditi.; “A Multi-Layered Framework for Secure Distributed Computing in Heterogeneous Cloud-Edge Environments Using Adaptive AI Orchestration”, 2019, American International Journal of Computer Science and Technology, vol. 1 Issue 3, p. No. 1-11. (Year: 2019).*
State Intellectual Property Office of the People’s Republic of China, International Search Report issued in Application No. PCT/CN2022/095088, Aug. 10, 2022, 10 pages.
Extended European Search Report for Application No. 22891410.7 mailed Mar. 5, 2025, 8 pages.
Quantum Key Distribution (QKD); Application Interface, ETSI GS QKD 004 V2.1.1, Aug. 2020, 22 pages.
Chinese Patent Office, First Office Action issued in Chinese Patent Application No. CN202111323068.X dated Dec. 20, 2021.
Chinese Patent Office, First Office Action issued in Chinese Patent Application No. CN202111323379.6 dated Dec. 22, 2021.
Bernd Teufel et al., “Blockchain energy: Blockchain in future energy systems”, Journal of Electronic Science and Technology, (2019), vol. 17, 11 pages.
Shangbin Lv et al., “Intelligent technology embodies the three realms of ‘domain-defined’ media: Prospects for the future world communication landscape”, Journal of Communication University of China, Nov. 15, 2018 (Nov. 15, 2018), No. 11, pp. 37-45.
Jun Zhang et al., “Quantum blockchain: can blockchain integrated with quantum information technology resist quantum supremacy”, Chinese Journal of Intelligent Science and Technology, Dec. 2019 (Dec. 2019), vol. 1, No. 4, pp. 201945-1-201945-6.

* cited by examiner

QUANTUM KEY-BASED BLOCKCHAIN NETWORK AND DATA SECURE TRANSMISSION METHOD

The present application is the national phase of International Patent Application No. PCT/CN2022/095088, filed on May 25, 2022, which claims the priority to Chinese Patent Application No. 202111323379.6, filed on Nov. 10, 2021 with the China National Intellectual Property Administration, both of which are incorporated herein by reference in their entireties.

FIELD

The present disclosure relates to the technical field of quantum information, and in particular to a quantum-secured blockchain network and a method for secure data transmission.

BACKGROUND

Blockchain is an innovative application mode of computer technologies such as distributed data storage, point-to-point transmission, consensus mechanism, and encryption algorithm in the Internet era. The blockchain has been widely applied in various fields such as Internet of things, intelligent manufacturing, supply chain management, and digital asset trading.

FIG. 1 is a schematic diagram illustrating a typical blockchain network. As shown in FIG. 1, the blockchain network includes multiple blockchain nodes connected through optical fiber links. Secure data transmission between blockchain nodes is underpinned by cryptography. At present, the data is generally encrypted using a symmetric cryptographic algorithm that performs fast in encryption and decryption. However, a symmetric key applied to the symmetric cryptographic algorithm is distributed by an asymmetric cryptographic system. A data sender randomly generates the symmetric key using a classical random number generator first, then encrypts the symmetric key using a private key of the sender and finally transmits the encrypted symmetric key to a receiver. The receiver decrypts the symmetric key using a public key of the sender, to obtain plaintext of the symmetric key, and then performs the secure data transmission with the sender using the symmetric key. Therefore, security of data transmission in the current blockchain network depends on security of the symmetric key. A leak of the key may cause data theft or data corruption.

As described above, the symmetric key is randomly generated by a random number generator at one end, encrypted using the asymmetric key and transmitted to a node at an opposite end nowadays. However, the asymmetric key dependent on computational complexity is prone to decipherment as the computing capability advances, exposing the symmetric key to a risk of leakage. In addition, the symmetric key is generated by a classical random number generator. Based on the certainty principle of the classical physics, the generated data sequence is predictable once all conditions are known. The symmetric key will be leaked if the random number is deciphered, and consequently the entire blockchain network is insecure.

SUMMARY

In view of the existing security risks, it is found that the quantum key distribution network which is based on the quantum key distribution technology can distribute a shared quantum key among nodes with optical links in the network. Then, the shared quantum key can be securely relayed to other nodes in the network using trusted relay technology. In this way, any two nodes in the network can share a quantum key. The quantum key distribution network distributing the quantum key between nodes is remarkably similar to transmission of a key across a P2P network in the blockchain. Based on this similarity, a quantum-secured blockchain network and a method for secure data transmission are provided according to the present disclosure. The corresponding quantum key distribution subset is deployed for the blockchain subnet, for providing the quantum key to the blockchain nodes, so as to realize secure data transmission. Therefore, according to the blockchain network and the method for the secure data transmission provided in the present disclosure, the blockchain nodes can be provided with the symmetric key using the quantum key distribution technology with high security. Since the quantum state is not cloneable, uncertain and is prone to collapse, the key is secured from leakage. Further, the quantum random number generator for the quantum key distribution can generate an unpredictable true random number based on the probabilistic nature of quantum mechanics. The true random number is hardly predictable. Therefore, the symmetric key is highly secure and then data can be securely transmitted between blockchain nodes. This is especially applicable to blockchain systems with high security requirements such as the blockchain government affairs system and the blockchain free trade system.

A first aspect of the present disclosure relates to a quantum-secured blockchain network, which includes a blockchain subnet and a quantum key distribution subnet. The blockchain subnet includes multiple blockchain nodes. The quantum key distribution subnet includes multiple quantum key distribution nodes and is configured to distribute a shared quantum key between two of the quantum key distribution nodes. The quantum key distribution nodes are deployed in the respective blockchain nodes, for the blockchain nodes to acquire the shared quantum key from the quantum key distribution nodes. The blockchain nodes are configured to: encrypt data using the shared quantum key, for secure transmission of the data between the blockchain nodes.

Further, the quantum key distribution subnet includes a centralized control node, a trusted relay node and a user terminal node. The user terminal node is configured to provide the shared quantum key to a user device. The trusted relay node is configured to relay the shared quantum key between two quantum key distribution nodes that are not directly connected. The centralized control node is a trusted relay node where a control server is deployed.

Further, the centralized control node and the trusted relay node are configured to provide the shared quantum key to the user device. At least two of the quantum key distribution nodes include a quantum satellite ground station for establishing a free space link with a quantum satellite.

Further, adjacent quantum key distribution nodes are configured to communicate with each other through an optical fiber link or a free space link.

Further, a quantum key distribution node comprising a mobile quantum satellite ground station is deployed in a mobile blockchain node.

Further, the blockchain nodes are further configured to generate a message authentication code based on the shared quantum key and the data, for verifying completeness and authenticity: The blockchain nodes include a terminal device and a server, and are configured to transmit the encrypted data between the terminal device and the server, and generate the message authentication code based on the shared quantum key and the data, for verifying completeness.

In an embodiment, the data is encrypted with one-time pad using an XOR encryption algorithm. The message authentication code is generated using an HMAC algorithm or a CBC MAC algorithm. The data includes one or more of transaction information broadcast data, transaction information verification broadcast data, and shared data.

A second aspect of the present disclosure relates to a method for secure data transmission across a quantum-secured blockchain network. The method includes: a quantum key acquisition step and a data encryption step. The quantum key acquisition step includes: deploying the quantum key distribution nodes in the respective blockchain nodes, distributing the shared quantum key between the quantum key distribution nodes, and acquiring the shared quantum key by the blockchain nodes from the quantum key distribution nodes. The data encryption step includes: encrypting the data by the blockchain nodes using the shared quantum key.

Further, the method includes: deploying a quantum key distribution node including a mobile quantum satellite ground station in a mobile blockchain node.

Preferably; the method for secure data transmission according to the present disclosure may be implemented by the quantum-secured blockchain network described above.

BRIEF DESCRIPTION OF THE DRAWINGS

The embodiments of the present disclosure are described in detail below in conjunction with the drawings.

In order to clearly illustrate the technical solutions in the embodiments of the present disclosure or the conventional technology, the drawings used in the description of the embodiments or the conventional technology will be briefly introduced below. Apparently, the drawings in the following description merely show some embodiments of the present disclosure, those skilled in the art may obtain other drawings based on these drawings without creative efforts.

DETAILED DESCRIPTION

Figure 1:
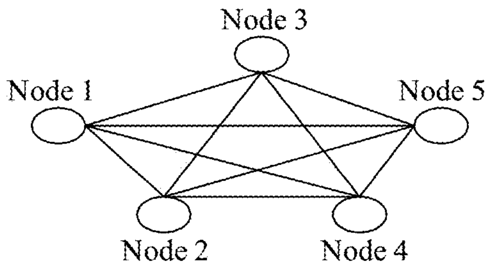
FIG. 1 is a schematic diagram illustrating a typical blockchain network according to conventional technology.

Hereinafter, exemplary embodiments of the present disclosure will be described in detail with reference to the drawings. The following embodiments are provided in a manner of example for fully conveying the spirit of the present disclosure to those skilled in the art to which the present disclosure relates. Therefore, the present disclosure is not limited to the embodiments disclosed herein.

According to the present disclosure, a quantum-secured blockchain network includes a blockchain subnet and a quantum key distribution subnet.

The blockchain subnet includes multiple blockchain nodes that communicate with each other. In some embodiments, the blockchain nodes include a terminal device, for example, a handheld terminal. The handheld terminal communicates with the server in the blockchain nodes, to implement communication services such as shared data transmission, blockchain transaction information broadcasting, and blockchain transaction information verification broadcasting.

The quantum key distribution subnet includes multiple quantum key distribution nodes. A shared quantum key is generated between two quantum key distribution nodes through quantum key distribution.

The quantum key distribution nodes include a centralized control node, a trusted relay node, a user terminal node and the like.

The user terminal node is configured to provide a quantum key to a user device. For example, the user terminal node includes a quantum key injection device, a quantum key management device and a quantum key distribution device. The quantum key distribution device is configured to perform quantum key distribution between two nodes based on quantum mechanics. The quantum key management device is configured to manage the distributed quantum key, for example, storage the quantum key and output the quantum key. The quantum key injection device is configured to acquire, based on a quantum key demand, a quantum key or quantum random number from the quantum key management device, and inject the quantum key or quantum random number to the user device connected to the quantum key injection device.

The trusted relay node is configured to relay the quantum key between quantum key distribution nodes that are not directly connected, and configured to provide the quantum key to the user device generally. For example, the trusted relay node includes a quantum key injection device, a quantum key management device, and a quantum key distribution device.

The centralized control node is a special trusted relay node for which a control server serving the entire quantum key distribution subnet is deployed. For example, the trusted relay node includes a quantum key injection device, a quantum key management device, a quantum key distribution device and a control server.

According to the present disclosure, the quantum key distribution subnet is deployed in different manners by means of the optical fiber link and/or the free space link, depending on the specific architecture of the blockchain subnet.

Figure 2:
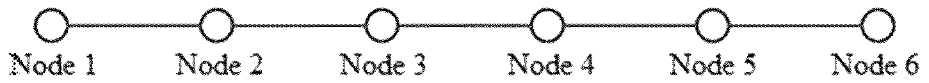
FIG. 2 is a schematic structural diagram illustrating a quantum key distribution subnet that is a linked list according an embodiment of the present disclosure.

FIG. 2 shows a topology of the quantum key distribution subnet according an embodiment of the present disclosure, where a linked list is applied.

As shown in FIG. 2, adjacent quantum key distribution nodes are directly connected through the optical fiber link, to distribute the quantum key through the optical fiber. Quantum key distribution nodes 1 and 6 each are configured as a user terminal node. The quantum key distribution nodes 2 to 5 each are configured as a trusted relay node. One of the quantum key distribution nodes 2 to 5 is provided with a control server, as the centralized control node. Therefore, the shared quantum key can be distributed between any two of the quantum key distribution nodes 1 to 6 by means of the relay technology.

Figure 3:
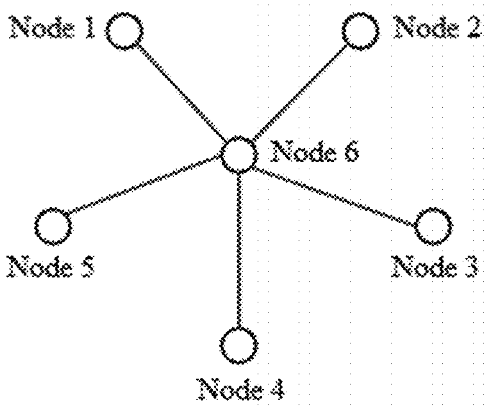
FIG. 3 is a schematic structural diagram illustrating a quantum key distribution subnet that is a star network according to an embodiment of the present disclosure.

FIG. 3 shows another topology of the quantum key distribution subnet according to an embodiment of the present disclosure, where a star network is applied.

As shown in FIG. 3, adjacent quantum key distribution nodes are directly connected through the optical fiber link, to distribute the quantum key through the optical fiber. The quantum key distribution node 6 is configured as the centralized control node. The quantum key distribution nodes 1 to 5 each are configured as a user terminal node. Therefore, the shared quantum key can be distributed between any two of the quantum key distribution nodes 1 to 6 without the relay technology.

Figure 4:
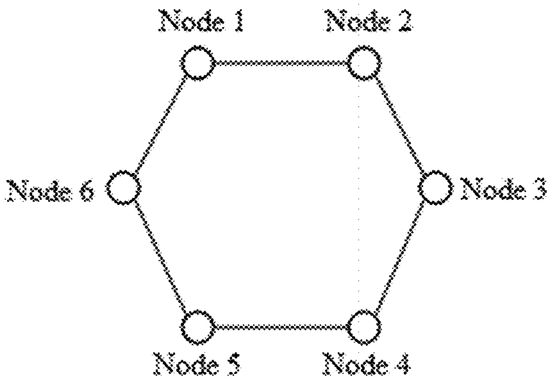
FIG. 4 is a schematic structural diagram illustrating a quantum key distribution subnet that is a ring topology according to an embodiment of the present disclosure.

FIG. 4 shows another topology of the quantum key distribution subnet according to an embodiment of the present disclosure, where a ring topology is applied.

As shown in FIG. 4, adjacent quantum key distribution nodes are directly connected through the optical fiber link, to distribute the quantum key through the optical fiber. Quantum key distribution nodes 1 to 6 each are configured as a trusted relay node, and one of the quantum key distribution nodes 1 to 6 is configured as the centralized control node. Therefore, the shared quantum key can be distributed between any two of the quantum key distribution nodes 1 to 6 by means of the relay technology.

Figure 5:
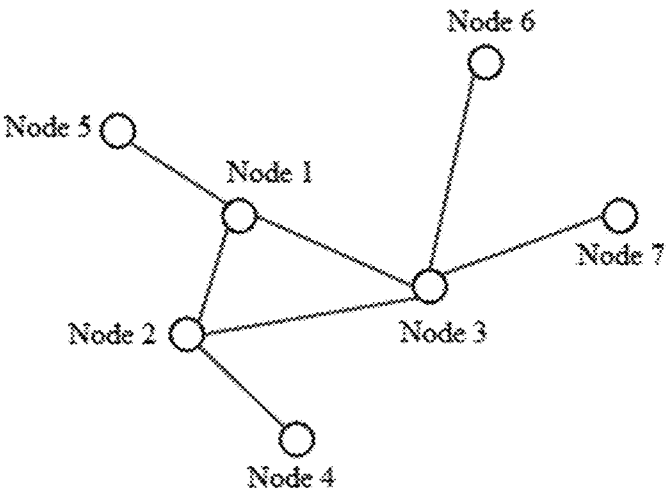
FIG. 5 is a schematic structural diagram illustrating a quantum key distribution subnet that is a mesh network according to an embodiment of the present disclosure.

FIG. 5 shows another topology of the quantum key distribution subnet according to an embodiment of the present disclosure, where a mesh network is applied.

A shown in FIG. 5, adjacent quantum key distribution nodes are directly connected through the optical fiber link, to distribute the quantum key through the optical fiber. Quantum key distribution nodes 1 to 3 each are configured as a trusted relay node, and one of the quantum key distribution nodes 1 to 3 is configured as the centralized control node. Quantum key distribution nodes 5 to 7 each are configured as a user terminal node. Therefore, the shared quantum key can be distributed between any two of the quantum key distribution nodes 1 to 7 by means of the relay technology.

Figure 6:
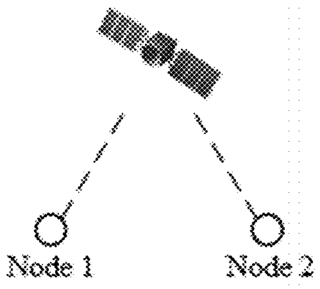
FIG. 6 is a schematic structural diagram illustrating a quantum key distribution subnet that is a satellite-ground network according to an embodiment of the present disclosure.

FIG. 6 shows a topology of a quantum key distribution subnet according to an embodiment of the present disclosure, where a satellite-ground network is applied.

As shown in FIG. 6, the quantum key distribution node 1 is connected to the quantum key distribution node 2 through a free space link, to distribute the quantum key between the quantum key distribution nodes 1 and 2 by the satellite. Those skilled in the art can understand that the quantum key distribution nodes 1 and 2 in FIG. 6 can be respectively deployed in any two adjacent quantum key distribution nodes in the network shown in FIGS. 2 to 5 as needed.

According to the present disclosure, the quantum key distribution nodes are deployed in the respective blockchain nodes, for the blockchain nodes to acquire the shared quantum key from the quantum key distribution nodes. The quantum key distribution nodes are adapted to corresponding blockchain nodes.

For example, an ordinary quantum key distribution node is deployed in a fixed node and is connected to the fixed node through the network. Therefore, the blockchain node can securely communicate with the quantum key distribution node (for example, the quantum key management device in the quantum key distribution node) to obtain the quantum key.

For example, a quantum key distribution node including a (mini) mobile quantum satellite ground station is deployed in a mobile node. Therefore, the quantum key distribution node can distribute the quantum key through the ground station and the quantum satellite, and transmit the quantum key to the quantum key management device for storage. Therefore, the blockchain node can securely communicate with the quantum key distribution node (for example, the quantum key management device) to obtain the quantum key.

In an embodiment, a blockchain node is provided with a terminal device, for example, a handheld terminal. The quantum key distribution node is configured to inject the quantum key to the handheld terminal and the blockchain node server, so that the handheld terminal can communicate with the server in an encrypted manner by means of the quantum key.

Corresponding quantum key distribution nodes are deployed in the blockchain nodes to distribute the shared quantum key between the blockchain nodes, secure data transmission can be implemented between the blockchain nodes in the blockchain subnet by means of the shared quantum key.

For example, communication services such as transaction information broadcasting and transaction information verification broadcasting are performed between blockchain nodes, and the broadcast data transmitted from point to point is encrypted using the shared quantum key: Further, completeness of data and authenticity are verified using the shared quantum key.

For example, data shared between blockchain nodes is encrypted using the shared quantum key. Further, completeness of the data and authenticity are verified using the shared quantum key.

For example, data shared between a handheld terminal and a node server in the blockchain node where the handheld terminal is located is encrypted using the shared quantum key: Further, completeness of the data and authenticity are verified using the shared quantum key.

According to the present disclosure, the data can be encrypted using different algorithms, depending on requirements for security. For example, the data is encrypted with one-time pad using an XOR encryption algorithm.

For authenticating the integrity of message, the message authentication code is generated based on the to-be-transmitted data with the shared quantum key serving as an input key using an algorithm, for example, an HMAC algorithm (hash algorithm) or a CBC MAC algorithm (symmetric encryption algorithm). The identity of the sender and the integrity of the transmitted data can be verified based on the message authentication code.

Figure 7:
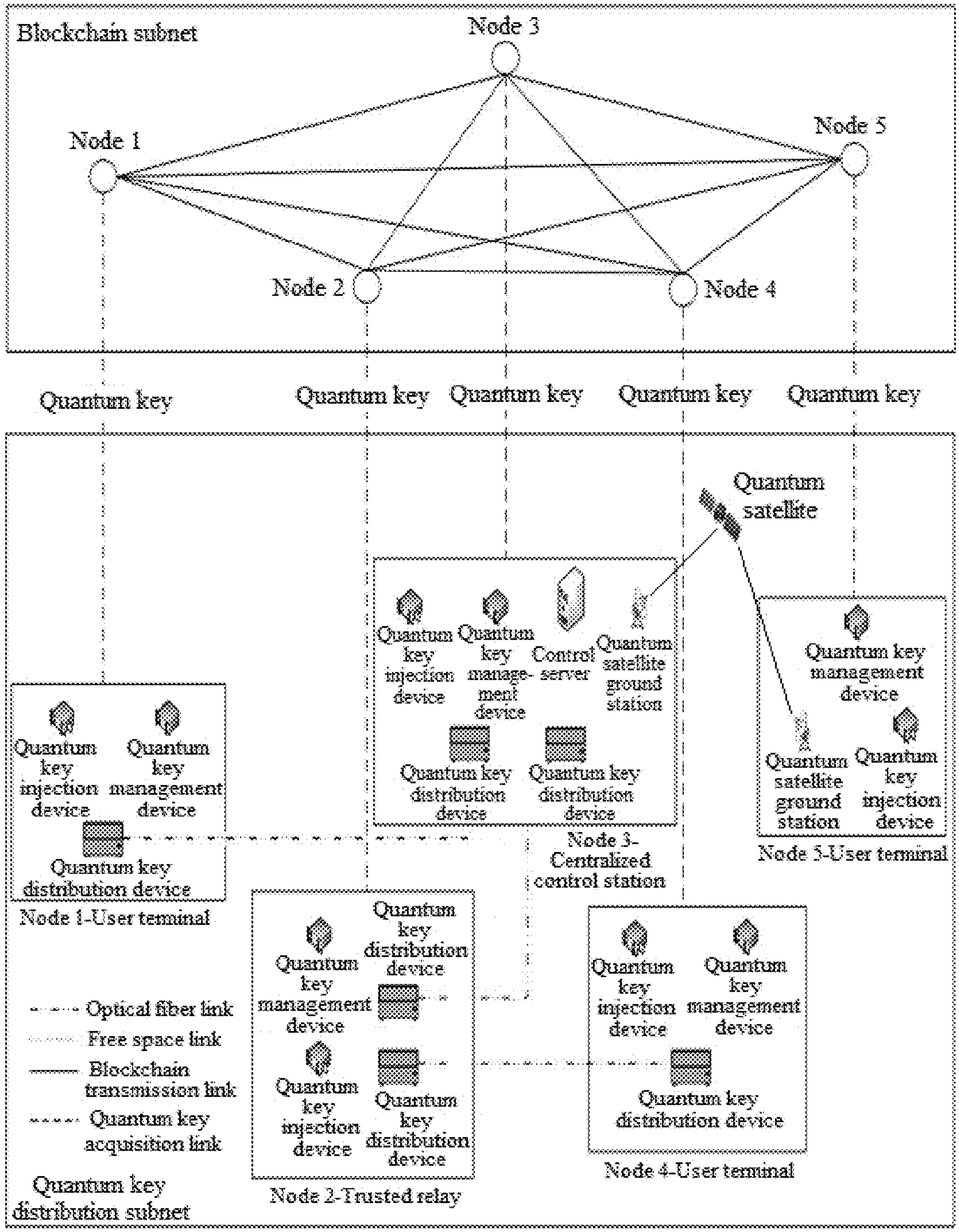
FIG. 7 is a schematic diagram illustrating a quantum-secured blockchain network according to an embodiment of the present disclosure.

FIG. 7 is a schematic diagram illustrating the quantum-secured blockchain network according to an embodiment of the present disclosure. The blockchain subnet includes five blockchain nodes 1 to 5. Accordingly, the quantum key distribution subnet includes five quantum key distribution nodes 1 to 5, which are deployed in the blockchain nodes 1 to 5 respectively.

According to the blockchain subnet shown in FIG. 7, the quantum key distribution subnet is configured as follows. Quantum key distribution nodes 1, 4 and 5 each are a user terminal node, quantum key distribution nodes 2 and 3 each are a trusted relay node. Further, a control server is deployed in the quantum key distribution node 3 as a centralized control station.

The user terminal nodes 1, 4 and 5 each include a quantum key injection device, a quantum key management device and a quantum key distribution device, for outputting, managing and distributing the quantum key.

The trusted relay nodes 2 and 3 each include a quantum key injection device, a quantum key management device and a quantum key distribution device, for outputting, managing and distributing the quantum key.

Quantum key distribution nodes 1 to 4 are connected to each other through optical fiber links, while no optical fiber link is arranged between the quantum key distribution node 5 and each of the quantum key distribution nodes 1 to 4. Instead, a quantum satellite ground station is arranged in each of the quantum key distribution nodes 5 and 3, to establish a free space link between the quantum key distribution nodes 5 and 3.

Therefore, in the quantum key distribution subnet shown in FIG. 7, the shared quantum key is distributed by the quantum key distribution device through the ground optical fiber link between quantum key distribution nodes 1 and 3, between quantum key distribution nodes 2 and 3, and between quantum key distribution nodes 2 and 4, and further securely stored in the key management device. In an embodiment, the quantum key distribution node 3 is far away from the quantum key distribution node 5, or the quantum key distribution node 5 is deployed in the mobile blockchain node, the quantum key is distributed through the quantum satellite between the two nodes and is received by the quantum satellite ground station. Alternatively, the quantum key distribution node 3 serves as the relay node, and then each two of the five quantum key distribution nodes can share a quantum key.

Therefore, by means of the block chain network according to the present disclosure, secure data transmission can be realized between the blockchain modes. Correspondingly, a method for secure data transmission across a quantum-secured blockchain network is provided according to the present disclosure.

The method for the secure data transmission includes a quantum key acquisition step and a data encryption step.

In the quantum key acquisition step, quantum key distribution nodes are deployed in blockchain nodes respectively, a shared quantum key is distributed between each two of the quantum key distribution nodes, for the blockchain node to acquire the shared quantum key from the corresponding quantum key distribution nodes.

As described above, quantum key distribution nodes with different configurations are deployed is the blockchain nodes. For example, a quantum key distribution node with a mobile quantum satellite ground station is deployed in a mobile node, to distribute the quantum key through the free space link.

In the data encryption step, the blockchain nodes encrypt the data using the shared quantum key: The encrypted data is transmitted between the blockchain nodes.

Further, the message authentication code is generated based on the shared quantum key and the to-be-transmitted data, for verifying completeness.

For the purpose of brevity, reference is made to the foregoing for details about the topology of the quantum key distribution node, the distribution of the shared quantum key, and the encryption of data transmitted between the blockchain nodes.

It can be seen from the foregoing that data can be securely transmitted between blockchain nodes using the quantum key instead of the classical symmetric key by combining the QKD and the blockchain, thereby eliminating the resulting risk of data theft since the computing capability advances or classical random number is predictable. The key for encryption is from the quantum key distribution subnet which allows a key in any length to be encrypted with one-time pad using the XOR encryption algorithm. Therefore, the problem of relatively low efficiency in encryption and decryption using the asymmetric key algorithm, and poor security resulted from the failure to encrypt data with one-time pad using the XOR encryption algorithm because the symmetric key distributed using the asymmetric key algorithm is relatively short and dependent on symmetric encryption algorithms such as 3DES and AES can be solved. In addition, a specific solution using a mini mobile quantum satellite ground station is further provided for a specific application scenario where the conventional blockchain node attempts to access a distant and mobile node (for example, a logistics cargo carrier). Therefore, the quantum key can be transmitted between the satellite and ground by means of a quantum satellite. The mini mobile quantum satellite ground station is movable following the mobile node, for the mobile and distant node to access the blockchain more conveniently for secure data transmission.

Although the present disclosure has been described above through specific embodiments in conjunction with the drawings, those skilled in the art should understand that the above-mentioned embodiments are illustrative only for illustrating the concept of the present disclosure, rather than limiting the scope of the present disclosure. Those skilled in the art may make various combinations, modifications, and equivalent substitutions to the above-mentioned embodiments without departing from the spirit and scope of the present disclosure.

The invention claimed is:

1. A quantum-secured blockchain network, comprising:

a blockchain subnet comprising a plurality of blockchain nodes; and a quantum key distribution subnet comprising a plurality of quantum key distribution nodes and configured to distribute a shared quantum key between two of the quantum key distribution nodes, wherein the quantum key distribution nodes are deployed in the blockchain nodes, for the blockchain nodes to acquire the shared quantum key from the quantum key distribution nodes respectively; and the blockchain nodes are configured to: encrypt data using the shared quantum key, for secure transmission of the data between the blockchain nodes; and generate a message authentication code based on the shared quantum key and the data, for verifying completeness and authenticity, wherein the data comprises one or more of transaction information broadcast data and transaction information verification broadcast data, wherein the quantum key distribution nodes comprise a trusted relay node, a first user terminal node and a second user terminal node, each of the trusted relay node, the first user terminal node and the second user terminal node comprises a quantum key distribution device configured to perform quantum key distribution based on quantum mechanics, and the trusted relay node is configured to relay the shared quantum key between the first user terminal node and the second user terminal node.

2. The quantum-secured blockchain network according to claim 1, wherein each of the first user terminal node and second user terminal node is configured to provide the shared quantum key to a user device.

3. The quantum-secured blockchain network according to claim 2, wherein the trusted relay node is further configured to provide the shared quantum key to the user device.

4. The quantum-secured blockchain network according to claim 1, wherein adjacent quantum key distribution nodes are configured to communicate with each other through an optical fiber link or a free space link.

5. The quantum-secured blockchain network according to claim 1, wherein the blockchain nodes comprise a terminal device and a server, and are configured to transmit the encrypted data between the terminal device and the server, and generate the message authentication code based on the shared quantum key and the data, for verifying completeness.

6. The quantum-secured blockchain network according to claim 5, wherein the data is encrypted with one-time pad using an XOR encryption algorithm; and/or the message authentication code is generated using a (hash-based message authentication code) (HMAC) algorithm or a cipher block chaining message authentication code (CBC MAC) algorithm; and/or the data further comprises shared data.

7. A method for secure data transmission, applied to a quantum-secured blockchain network according to claim 1, and the method comprises:

a quantum key acquisition step comprising: deploying the quantum key distribution nodes in the blockchain nodes respectively, distributing a shared quantum key between the quantum key distribution nodes, and acquiring the shared quantum key by the blockchain nodes from the quantum key distribution nodes; and a data encryption step comprising: encrypting data by the blockchain nodes using the shared quantum key, wherein the data comprises one or more of transaction information broadcast data and transaction information verification broadcast data, wherein the method further comprises:

generate a message authentication code based on the shared quantum key and the data, for verifying completeness and authenticity, and relaying, by the trusted relay node, the shared quantum key between the first user terminal node and the second user terminal node.

* * * * *